United States Patent
Mori et al.

(10) Patent No.: US 7,035,747 B2
(45) Date of Patent: Apr. 25, 2006

(54) METHOD AND APPARATUS TO GENERATE TEST SEQUENCES FOR COMMUNICATION PROTOCOLS

(75) Inventors: Takanori Mori, Tokyo (JP); Hirotaka Otsuka, E-17, Fujigaya, Shounan-machi Higashikatsushika-gun, Chiba 277-0931 (JP); Nobuo Funabiki, Okayama (JP); Akio Nakata, Osaka (JP); Teruo Higashino, Osaka (JP)

(73) Assignees: National Institute of Information and Communications Technology, Tokyo (JP); Hirotaka Otsuka, Chiba (JP)

( * ) Notice: Subject to any disclaimer, the term of this patent is extended or adjusted under 35 U.S.C. 154(b) by 305 days.

(21) Appl. No.: 10/689,553

(22) Filed: Oct. 21, 2003

(65) Prior Publication Data

US 2005/0086020 A1 Apr. 21, 2005

(51) Int. Cl.
*G01D 3/00* (2006.01)
*G01M 19/00* (2006.01)

(52) U.S. Cl. ....................................... 702/108
(58) Field of Classification Search ....................... None
See application file for complete search history.

(56) References Cited

U.S. PATENT DOCUMENTS

| | | | | |
|---|---|---|---|---|
| 6,034,623 | A | * | 3/2000 | Wandel .................. 340/870.01 |
| 2004/0019468 | A1 | * | 1/2004 | De Moura et al. ............... 703/2 |
| 2004/0193709 | A1 | * | 9/2004 | Selvaggi et al. ............ 709/224 |

* cited by examiner

*Primary Examiner*—Michael Nghiem
*Assistant Examiner*—Demetrius Pretlow

(57) ABSTRACT

A method and apparatus for generating test sequences for communication protocols that inputs data of finite state machines (FSM) representing the specification of the communication protocols, converts the test sequence generation problem to the satisfiability problem (SAT problem), and generates test sequences for communication protocols by solving the SAT problem. The method converts the test sequence generation problem to the SAT problem by modifying the FSM and describing the test sequence generation problem using a conjunctive normal form formula based on the modified FSIM. By considering multiple input/output (UID) sequences and overlapping sequences, the method generates minimum length test sequence to check whether the states described in the specification of the protocol exist in the implementation of the FSM.

16 Claims, 14 Drawing Sheets

| state($s_i$) | UIO sequence |
|---|---|
| $s_0$ | (y/2)(x/1) (x/2)(y/1) |
| $s_1$ | (y/2)(x/2) |
| $s_2$ | (x/2)(y/2) |
| $s_3$ | (y/1)(y/1) |
| $s_4$ | (x/1)(y/1) |

1. $H' = \emptyset, \quad I' = \emptyset$
2. for $s_{ij} \in S'$ {
3.     if $i == 0$ then $I' = I' \cup \{s_{ij}\}$
4.     for $s \in S \cup S'$ {
5.         if $(s, s_i, x, y) \in H \cup H'$ then
6.             $H' = H' \cup (s, s_{ij}, x, y)$
7.         if $(s_j, s, x, y) \in H \cup H'$ then
8.             $H' = H' \cup (s_{ij}, s, x, y)$
9.     }
10. }

Fig. 11

|  | the number of variables | the number of clauses | the length of test sequence |
|---|---|---|---|
| Experiment 1 | 24 | 77 | 15 |
| Experiment 2 | 41 | 210 | 15 |
| Experiment 3 | 21 | 72 | 13 |
| Experiment 4 | 33 | 171 | 13 |

Fig. 12

| the number of UIO sequences | the number of variables | the number of clauses | the time to generate logical formula (second) | the time to execute SAT solver (second) |
|---|---|---|---|---|
| 18 | 422 | 6668 | 0.02 | 0.37 |
| 14 | 369 | 5137 | 0.01 | 0.23 |
| 28 | 482 | 9960 | 0.02 | 0.70 |
| 42 | 653 | 17996 | 0.03 | 2.40 |

| state($s_i$) | UIO sequence |
|---|---|
| $s_1$ | (a/z) |
| $s_2$ | (a/w) |
| $s_3$ | (a/y)(a/y) |
| $s_4$ | (a/y)(b/x) |
| $s_5$ | (a/x) |
| $s_6$ | (b/x) |

Fig. 17

| the number of subsequence | the length of sequence | the number of variables | the number of clauses | execution time |
|---|---|---|---|---|
| 30 | 31(122) | 1307 | 28879 | 6.766 |
| 45 | 57(202) | 3270 | 96976 | 19.766 |
| 60 | 62(248) | 4473 | 166072 | 48.953 |
| 70 | 75(295) | 6169 | 260095 | 102.724 |
| 77 | 91(342) | 8135 | 371643 | 345.615 |

Fig. 18

| the number of subsequence | the length of sequence | the number of variables | the number of clauses | execution time |
|---|---|---|---|---|
| 30 | 31(122) | 1307 | 29747 | 5.360 |
| 45 | 57(202) | 3270 | 100054 | 19.711 |
| 60 | 62(248) | 4473 | 169730 | 48.799 |
| 70 | 75(295) | 6169 | 265495 | 112.333 |
| 77 | 91(342) | 8135 | 379651 | 367.433 |

Fig. 19

| the condition considering the overlap of sub-sequences | the length of sequence | the number of variables | the number of clauses | execution time |
|---|---|---|---|---|
| none | 91(342) | 8135 | 371643 | 345.724 |
| condition 1 | 74(321) | 7609 | 399727 | 262.744 |
| conditions 1 and 2 | 71(313) | 7714 | 427961 | 308.868 |

Fig. 20

| the length of sequence | the number of subsequence | the number of variables | the number of clauses | execution time |
|---|---|---|---|---|
| 74 | | 7609 | 399727 | 262.744 |
| 76 | | 7819 | 410857 | 207.930 |
| 80 | 77 | 8239 | 433117 | 214.773 |
| 90 | | 9289 | 488767 | 267.234 |
| 100 | | 10339 | 544417 | 324.324 |

METHOD AND APPARATUS TO GENERATE TEST SEQUENCES FOR COMMUNICATION PROTOCOLS

TECHNICAL FIELD TO WHICH THE INVENTION PERTAINS

The present invention relates to the technique of generating test sequences. Particularly, the present invention relates to the method and apparatus to generate test sequences for communication protocols which converts the test sequence generation problem to the SAT problem, and generates test sequences for communication protocols by solving the SAT problem.

DESCRIPTION OF THE RELATED ART

The SAT problem (satisfiability problem) is a combinatorial optimization problem and known as a NP-complete problem academically. In SAT problem, for the conjunctive normal form of a given logical formula f, we would like to check whether formula f is satisfiable or not, and if formula f is satisfiable, truth-value assignment should be derived for the variables in f quickly. Recently, since the performance of algorithms for SAT problem is improved, the algorithms can be applied to the practical problems such as electronic design automation.

When we test communication protocols which are modeled as finite state machines (FSM), we use input/output sequences which identify the states of a given FSM. DS (Distinguish Sequence) and UIO sequence (Unique Input/Output Sequence) are proposed as such input/output sequences.

These sequences are input/output sequences which can be executed from only a given state in the FSM. In general, a given FSM may not have a DS nor UIO sequences. However, it is known that almost all FSMs describing practical protocols have UIO sequences. Sometimes, each state of an FSM may have multiple UIO sequences.

In conformance testing for FSM based communication protocols, for a given implementation under test (IUT), we check the existence of states and the correctness of state transition of the corresponding specification of the protocols. The test sequence generation problem is the problem which generates the test sequences to check whether there exists the states which is described in the protocol specification in the implementation under test and whether the state transition is correctly implemented.

To check whether there exists a state s in a given IUT, first, we generate an input sequence called a preceding sequence to lead the IUT to state s. The protocol machine moves from its initial state to state s by executing the preceding sequence. We concatenate the preceding sequence and a UIO sequence for state s, and apply the obtained sequence to the IUT.

On the other hand, to check whether a state transition t from state s to state s' is correctly implemented, we concatenate the preceding sequence for state s, the input/output action corresponding to state transition t and a UIO sequence for state s', and apply the obtained sequence to the IUT. Here, the sequence obtained by concatenating the input/output action of t and a UIO sequence for state s' is called a transition-uio. We construct test subsequences by generating the above input/output sequences for all states and state transitions. Here, a test subsequence represents either a preceding sequence+UIO sequence or a preceding sequence+transition-uio. By concatenating these test subsequences, we obtain a test sequence for the IUT.

If we can use a test subsequence as a preceding sequence for another test subsequence, then we can generate a shorter test sequence. In addition, since each state may have multiple UIO sequences, the length of the test sequences depends on the selection of UIO sequences. Furthermore, if two or more UIO sequences or transition-uios have common parts, then we can overlap such common parts and generate a shorter test sequence.

In general, the problem of generating a minimum length test sequence without considering sequence overlapping is a NP-complete problem. The problem of generating a minimum length test sequence considering sequence overlapping is also a NP-complete problem.

One of the conventional methods to generate a test sequence proposes an algorithm which generates a UIO sequence for each state in a given FSM and generates a test sequence to check the existence of states and the correctness of state transition. Another method also proposes a method to generate a minimum length test sequence to check state transitions when a given FSM has reset transitions (the FSM can return to its initial state by executing the reset transition) or all states in a given FSM have self loops.

Another conventional method to generate a test sequence generates a test sequence by using a single UIO sequence for each state in a given FSM but does not consider sequence overlapping. The other method generates test sequence considering multiple UIO sequences.

However, the conventional methods described above cause such a problem that the length of test sequence or time needed to execute the process of generating test sequences get longer when the test sequences to check whether there exists a state in a given IUT is generated in the case there exists overlapping of UIO sequences and when the sequences to check whether the state transition is correctly implemented is generated in the case there exists overlapping of subsequences.

SUMMARY OF THE INVENTION

The present invention generates test sequences to check whether the states of the specification for the protocol are implemented in the IUT by executing the step of inputting FSM M representing the specification for the communication protocol, the UIO sequence for each state of M, the state to be checked, and the maximum test sequence length and the step of converting the test sequence generation problem to the SAT problem and the step of solving the SAT problem by applying the SAT solver and generating test sequences.

In the step of converting the test sequence generation problem to the SAT problem, we execute the step of modifying the FSM and the step of representing the test sequence generation problem by a conjunctive normal form formula based on the modified FSM.

The present invention also generate the test sequence to check whether the state transitions are correctly implemented by executing the step of inputting FSM M representing the specification for the communication protocol, the UIO sequence for each state of M, the state transitions to be tested, the order constraints, the time constraints and the maximum test sequence length and the step of converting the test sequence generation problem to the SAT problem and the step of solving the SAT problem by applying the SAT solver and generating test sequences.

The step of converting the test sequence generation problem to the SAT problem, we execute the step of modifying the FSM and the step of representing the test sequence generation problem by a conjunctive normal form formula based on the modified FSM.

BRIEF DESCRIPTION OF THE DRAWINGS

FIG. 11 is a diagram which shows the result of the first embodiment of the present invention to generate test sequences.

FIG. 12 is a diagram which shows the result of the first embodiment of the present invention to generate test sequences.

FIG. 17 is a diagram which shows the result of the second embodiment of the present invention to generate test sequences.

FIG. 18 is a diagram which shows the result of the second embodiment of the present invention to generate test sequences.

FIG. 19 is a diagram which shows the result of the second embodiment of the present invention to generate test sequences.

FIG. 20 is a diagram which shows the result of the second embodiment of the present invention to generate test sequences.

DETAILED DESCRIPTION OF THE PREFERED EMBODIMENT

The present invention proposes a test sequence generation method which applies an algorithm for solving SAT problems to the generation of test sequences for the communication protocols which are represented by FSM (Finite State Machine).

Figure 1:
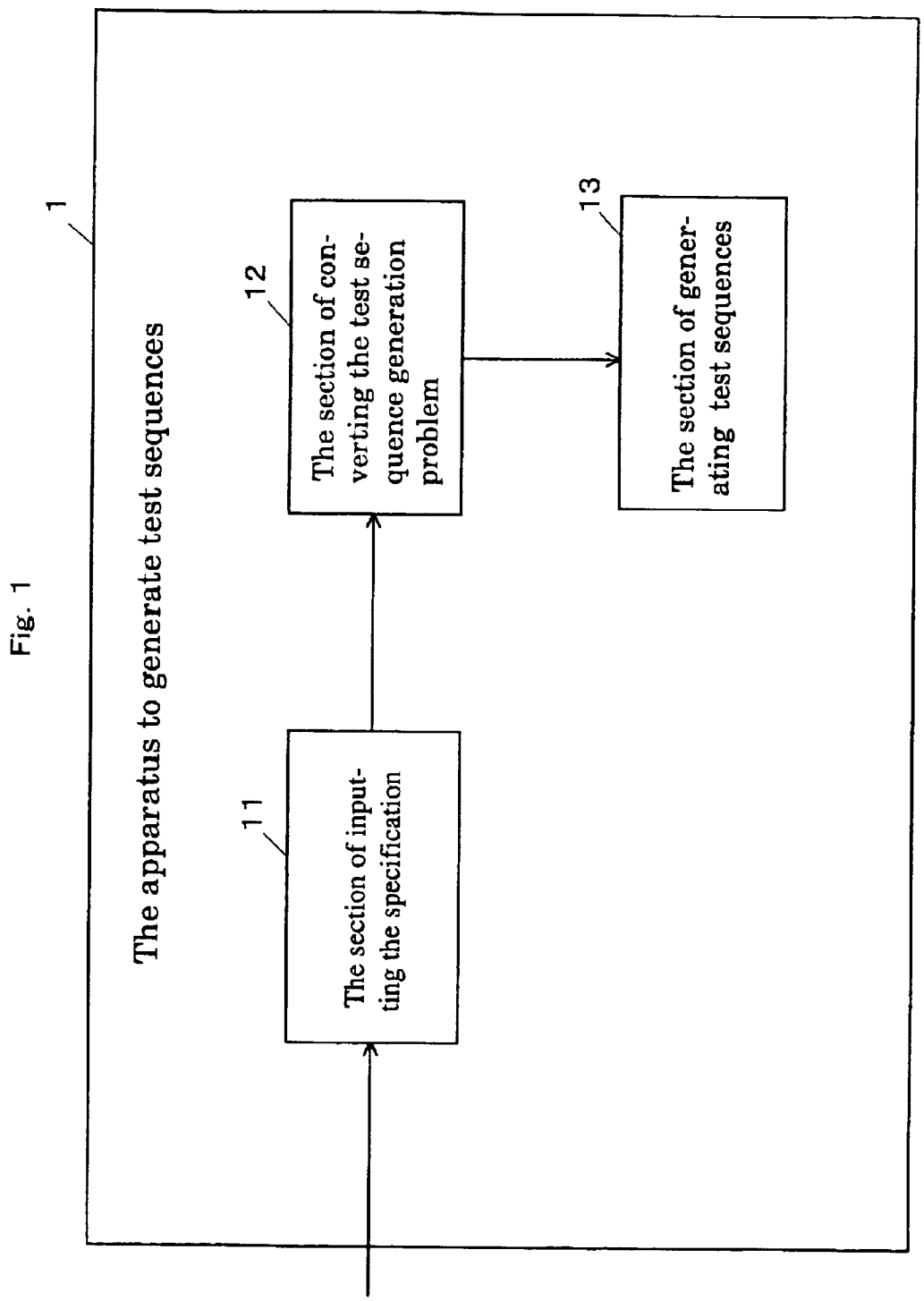
FIG. 1 is a diagram which shows a embodiment of the composition of the apparatus to generate test sequences of the present invention.

FIG. 1 is a diagram which shows a embodiment of the composition of the apparatus to generate test sequences of the present invention. In FIG. 1, 1 is the apparatus to generate test sequences of communication protocols. 11 is the section of inputting the specification which input FSM M representing the specification for the communication protocol and the state to be checked and so on, or input FSM M representing the specification for the communication protocol and the state transitions to be checked and so on. 12 is the section of converting the test sequence generation problem which converts the test sequence generation problem to the SAT problem. 13 is the section of generating test sequences which solves the SAT problem and generates test sequences.

Figure 2:
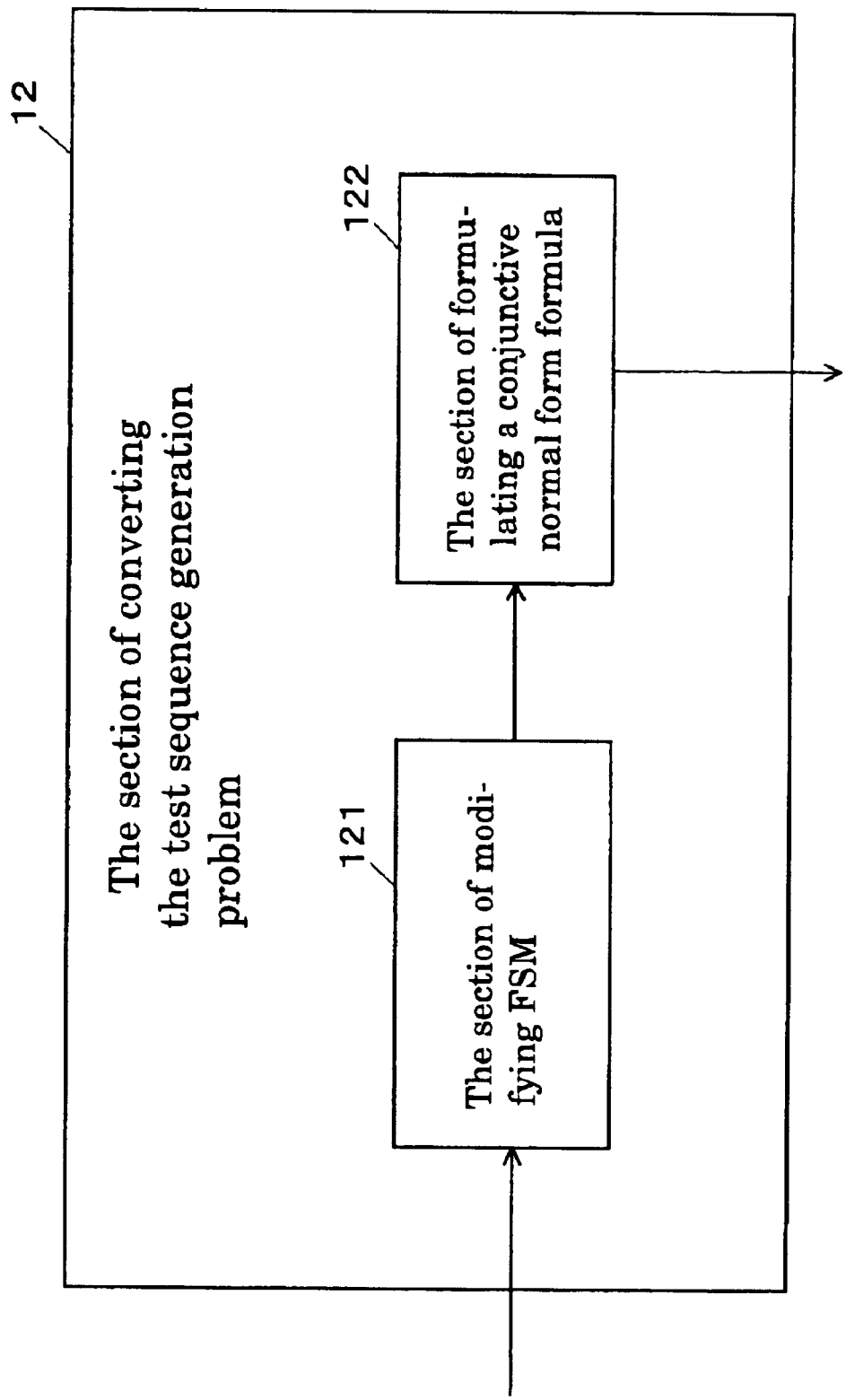
FIG. 2 is a diagram which shows the construction of the section of converting the test sequence generation problem.

FIG. 2 is a diagram which shows the construction of the section of converting the test sequence generation problem. In FIG. 2, 121 is the section of modifying FSM which modifies the FSM. 122 is the section of formulating a conjunctive normal form formula which generates the logical formula based on the modified FSM.

The First Embodiment

In the first embodiment of the present invention, we generate test sequences to check whether the state of the specification for the protocol is implemented in a given IUT by using UIO sequence. Particularly, in the first embodiment of the present invention, we consider multiple UIO sequences and overlapping of UIO sequences. The method generates minimum length test sequence to check whether the state is implemented in the IUT by using SAT algorithms.

In the proposed method of the first embodiment of the present invention, we represent the conditions for the behavior of FSM and test sequences by a conjunctive normal form formula. To evaluate the efficiency of the proposed method of the first embodiment of the present invention, we implemented the program of generating test sequences according to the proposed method of the first embodiment of the present invention and applied the program to DHCP (Dynamic Host Configuration Protocol).

First, as a premise for the first embodiment of the present invention, we describe a protocol machine, the conformance testing and the SAT problem.

(Protocol Machine)

A protocol machine is a Mealy deterministic finite state machine (FSM) and defined as the following 5-tuple (S, X, Y, H, $s_0$). Here, S, X and Y denote a finite set of states, input symbols and output symbols, respectively.

Figures 3, 4:
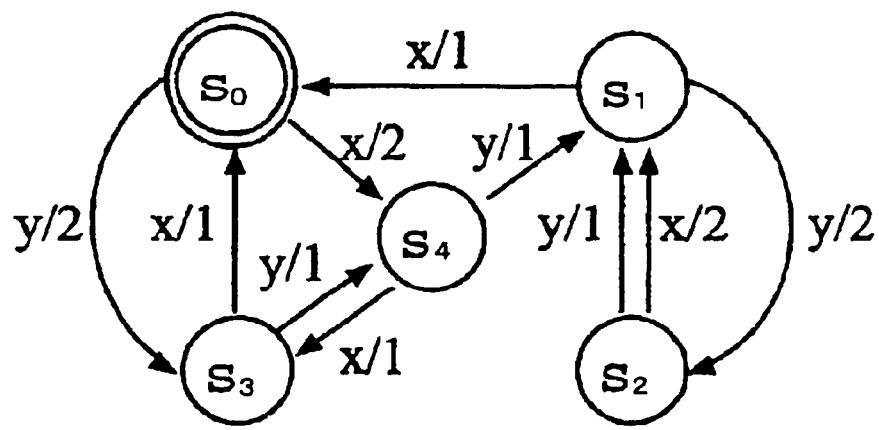
FIG. 3 is a diagram which shows a protocol machine described as FSM.
FIG. 4 is a diagram which shows the UIO sequences.

H represents a finite set of state transitions (u, v, x, y) where u, v ∈S, x∈X and y∈Y denote a starting state, a destination state, an input symbol and an output symbol, respectively. $s_0$ denotes the initial state of the protocol machine. FIG. 3 is an example of protocol machine described as an FSM.

(Conformance Testing)

In the first embodiment, we generate the test sequence to check whether all the states in the given protocol machine are implemented correctly in an implementation for the protocol machine which is called IUT (Implementation Under Test).

We can check the existence of state s for a given IUT in the following way. First, we generate an input sequence called a preceding sequence from the protocol specification. The protocol machine moves from its initial state to state s by executing the preceding sequence. After applying the preceding sequence to IUT, we check whether the IUT is in state s. Hence, we have to verify or identify all the states in the given FSM for conformance testing.

Each UIO sequence (Unique Input/Output sequence) can verify a single state in FSM. A UIO sequence for a state s in FSM M is an input/output sequence which cannot be executed from any other state of M.

Here, suppose that an input/output sequence $\alpha=(i_1/o_1)(i_2/o_2) \ldots (i_m/o_m)$ ($i_j$: an input, $o_j$: an output, $1 \leq j \leq m$) is a sequence for FSM M. When FSM M is in a state s, if the output sequence from M for the input sequence of α (i. e. $i_1 i_2 \ldots i_m$) is equivalent to the output sequence of α (i. e. $o_1 o_2 \ldots o_m$), then we say that the input/output sequence α is executable from state s in FSM M.

In general, all states of an arbitrary FSM may not have UIO sequences. However, it is known that almost all FSMs describing practical communication protocols have UIO sequences. Sometimes, each state of FSM may have multiple UIO sequences.

We can identify a state in a FSM using a UIO sequence for each state. For example, the UIO sequences for state $s_0$ shown in FIG. 3 are (y/2)(x/1) and (x/2)(y/1). UIO sequences for the each state si of the FSM in FIG. 3 are shown in the table of FIG. 4.

While we can identify a state in a FSM using one UIO sequence for each state, if we generate multiple UIO sequences for each state and derive a test sequence by selecting suitable UIO sequences, we may obtain a test sequence which is shorter than the case that we only consider a single UIO sequence for each state.

Furthermore, if two or more UIO sequences have common parts, then we can overlap those UIO sequences, and by using the obtained sequence, we may generate a shorter test sequence.

(SAT Problem)

In SAT problem, for the conjunctive normal form of a given logical formula f, we check whether formula f is satisfiable or not. If formula f is satisfiable, then we derive an assignment for each variable in f such that f=true. Formula f is a conjunction of multiple clauses. Each clause is a disjunction of variables x and/or negations of variables, written ¬x.

For SAT problem, a lot of algorithms are proposed. These algorithms are classified in two types: complete type and incomplete type. The complete type algorithms derive all truth-value assignments which satisfy a given logical formula.

However, it is hard for the complete type algorithms to solve large scale problems, since such algorithms basically analyze the whole solution space. GRASP, SATZ and so on are classified in this type.

On the other hand, the incomplete type algorithms derive quickly one truth-value assignment which satisfies a given logical formula, if the formula is satisfiable. Note that we cannot decide that the formula is unsatisfiable, even if we do not obtain a truth-value assignment.

Since the incomplete type algorithms analyze a part of the solution space to reduce the search space, such algorithms derive a truth-value quickly. Thus, the incomplete type algorithms can solve problems which the complete type algorithms cannot solve. MIPS_SAT is classified in this type.

If each state of a given protocol machine has a UIO sequence, then the protocol machine has a test sequence. Therefore, we use an incomplete type algorithm for solving a test sequence generating problem. Based on the result for DIMACS benchmark, we use MIPS_SAT. Hereafter, we call the implementation for a SAT algorithm as SAT solver.

Figure 5:
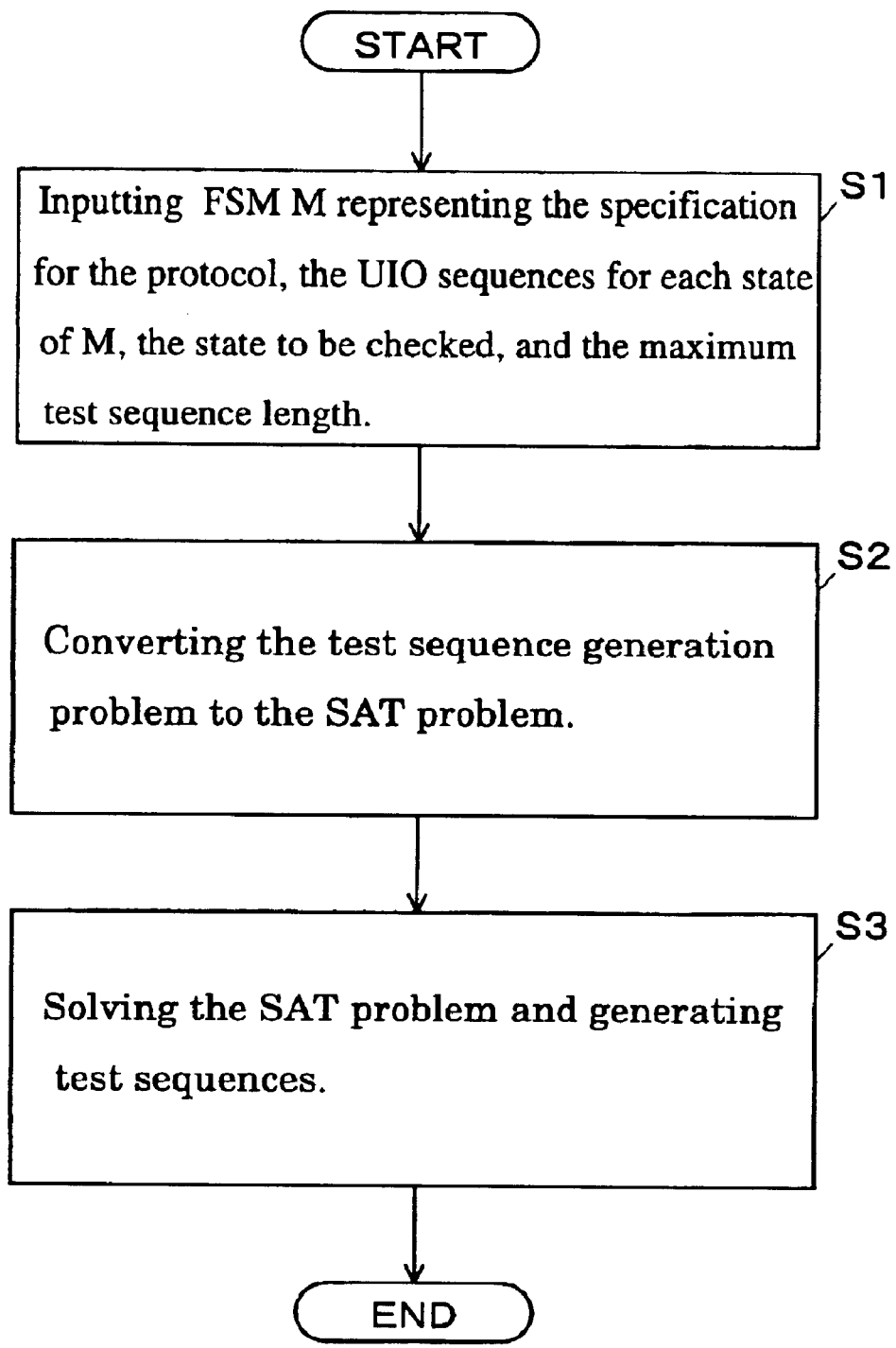
FIG. 5 is a diagram which shows the flowchart of the generating test sequences.

FIG. 5 is a diagram which shows the flowchart of generating test sequences according to the first embodiment of the present invention. The apparatus to generate test sequences of the first embodiment of the present invention generates test sequences to check whether each state in the protocol machine is correctly implemented by executing the following steps S1, S2 and S3.

Step S1: Inputting FSM M representing the specification for the protocol, the UIO sequence for each state of M, the state to be checked, and the maximum test sequence length. Step S1 is executed by the section of inputting the specification (FIG. 1–11).

Step S2: Converting the test sequence generation problem to the SAT problem. Step S2 is executed by the section of converting the test sequence generation problem (FIG. 1–12).

Step S3: Solving the SAT problem by applying the SAT solver (e.g. MIPS_SAT) and generating test sequences. Step S3 is executed by the section of generating test sequences (FIG. 1–13).

In the first embodiment of the present invention, we generate a conjunctive normal form formula based on the FSM M which represents the specification for the protocol and based on the UIO sequence for each state of M. Then, we generate test sequences by solving the logical formula with SAT solver.

In the first embodiment, we prepare a Boolean variable for each state in FSM. First, we construct a FSM M' from a given FSM M by adding states corresponding to the UIO sequences and the state transitions of the states (modifying the FSM). Next, we construct a logical formula which represents the behavior of M' and conditions for a test sequence.

The step of converting the test sequence generation problem to the SAT problem processed at the step S2 is comprised by the step of modifying the FSM with the section of modifying the FSM (FIG. 2–121) and the step of representing the test sequence generation problem by a conjunctive normal form formula based on the modified FSM with the section of formulating a conjunctive normal form formula (FIG. 2–122).

First, we describe the step of modifying FSM. We construct FSM M'=(S∪S', X, Y, H ∪ H', {$s_0$} ∪ I') by adding states corresponding to UIO sequences and state transitions corresponding to the added states to FSM M=(S, X, Y, H, $s_0$).

Here, S' denotes a finite set of states which are added. Suppose that we prepare a state $s_{ij}$ for a UIO sequence of state $s_i$, if M moves to state $s_j$ by executing the UIO sequence from state $s_i$.

The states corresponding to UIO sequence are the states which have the same input transitions as the input transitions of the starting state of the UIO sequence of the state to be checked and have the same output transitions as the output transitions of the destination state of the UIO sequence of the state to be checked.

Figures 6, 7:
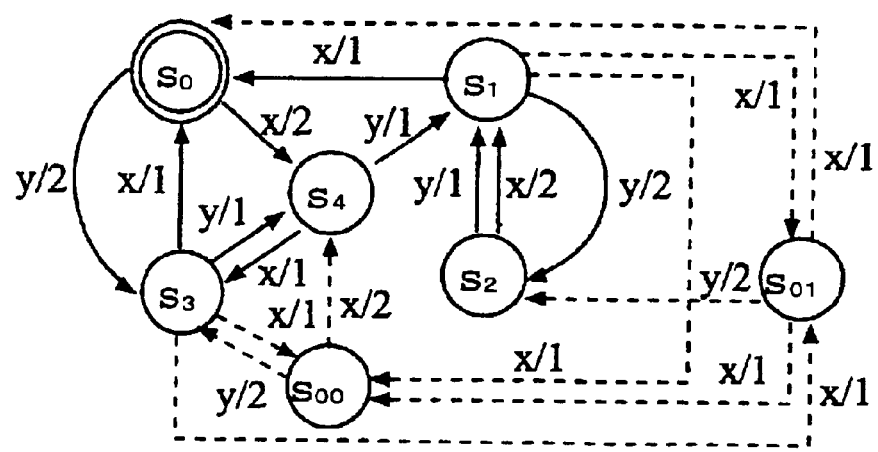
FIG. 6 is a diagram which shows the algorithm which constructs H' and I'.
FIG. 7 is a diagram which shows the FSM.

For example, for the FSM in FIG. 3 and the UIO sequence (y/2)(x/1) of state $s_0$, we prepare state $s_{00}$ as shown in FIG. 7. The state $s_{00}$ represents the behavior $s_0 \rightarrow s_3 \rightarrow s_0$. The input transitions of the starting state $s_0$ of the UIO sequence (y/2)(x/1) which is the UIO sequence for the state $s_0$ to be checked are $s_3 \rightarrow s_0$ and $s_1 \rightarrow s_0$, therefore, the input transition of the state $s_{00}$ to be added are the transitions $s_3 \rightarrow s_{00}$ and $s_1 \rightarrow s_{00}$.

The output transitions of the destination state $s_0$ of the UIO sequence (y/2)(x/1) which is the UIO sequence for the state so to be checked are transitions $s_0 \rightarrow s_4$ and $s_0 \rightarrow s_3$, therefore, the output transitions of the state $s_{00}$ to be added are $s_{00} \rightarrow s_4$ and $s_{00} \rightarrow s_3$. In addition, for the UIO sequence (x/2)(y/1), we prepare state $s_{01}$ in accordance with the criteria described above.

H' denotes a finite set of state transitions. Each element of H' is a state transition corresponding to state s'∈S'. I' denotes a finite set of states. Each element of I' is an element of S' (i. e. I' ⊆ S') and can behave as the initial state of M'. An algorithm which constructs the sets H' and I' is shown in FIG. 6. The state transitions whose destination states are state $s_{ij}$ are the same as those whose destination states are state $s_i$. Besides, the state transitions whose starting states are state $s_{ij}$ are the same as those whose starting states are state $s_j$.

For example, we obtain the FSM of FIG. 7 by adding states $s_{00}$ and $s_{01}$ and state transitions corresponding to these states to the FSM of FIG. 3. New state transitions are described as dotted arrows. States $s_{00}$ and $s_{01}$ are the elements of I'.

Next, if there are overlapped UIO sequences, we add the state which corresponds to the overlapped UIO sequences. For example, the UIO sequence of state $s_3$ is (y/1) (y/1) and that of state $s_4$ is (x/1)(y/1). These UIO sequences can be overlapped, and we obtain an overlapped sequence (x/1)(y/1)(y/1). We prepare state $s_{41}$ which corresponds to the overlapped sequence. The state $s_{41}$ is not shown here. The state transitions which corresponds to the state $s_{41}$ can be generated according to the criteria described above.

Figure 8A:
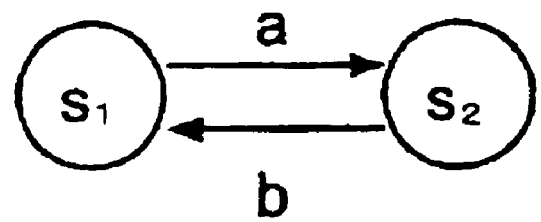
FIG. 8A is a diagram which shows the FSM.
Figure 8B:
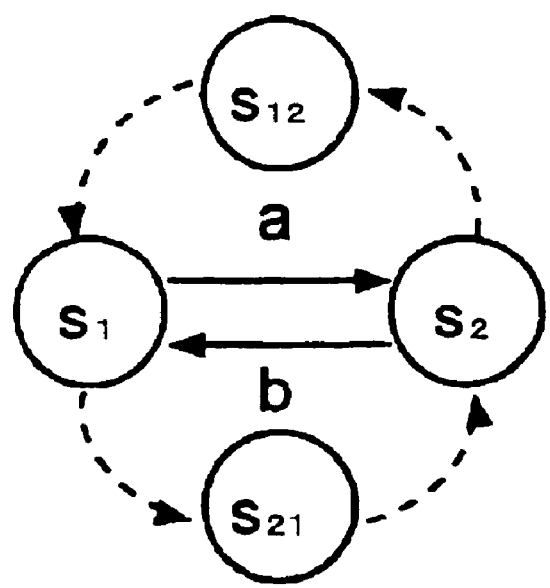
FIG. 8B is a diagram which shows the modified FSM.
Figure 9A:
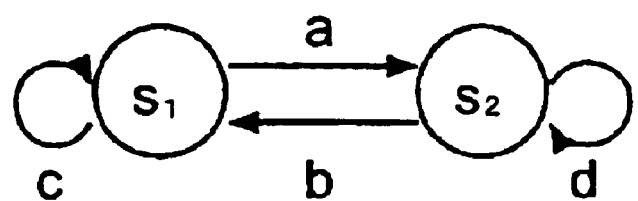
FIG. 9A is a diagram which shows the FSM.
Figure 9B:
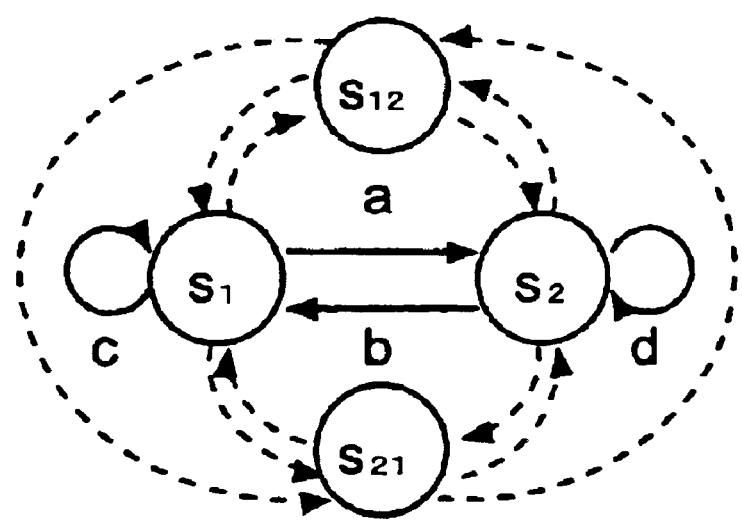
FIG. 9B is a diagram which shows the modified FSM.

However, there exist cases that the state transitions between new states are not generated. For example, assume that the FSM shown in FIG. 8A is a given specification and the state transitions a and b are UIO sequences of state $s_1$ and state $s_2$, respectively. We obtain the FSM shown in FIG. 8B by adding states and state transitions to the FSM shown in FIG. 8A according to the criteria described above.

In this FSM, the added states (UIO sequences) $s_{12}$ and $s_{21}$ cannot be visited continuously. Thus we cannot obtain the shortest test sequence. To avoid this case, we add dummy loop transitions to each state which does not have self loops in the specification (see FIG. 9A). The dummy loop transitions are c and d in the figure. If we modify FSM shown in FIG. 9A by adding loop transitions, we obtain the FSM shown in FIG. 9B. If a generated test sequence contains dummy loops, we remove the loops from the test sequence.

Next, we describe the step of representing test sequence generation problem as a conjunctive normal form formula based on the modified FSM. In the proposed method of the first embodiment of the present invention, we assume that a given FSM starts at time zero and executes one state transition at each time unit.

We construct a logical formula using Boolean variables $X[t][i]$. $X[t][i]$=true means that the FSM is in state $s_i$ at time t. For example, we consider three time units behavior for the FSM shown in FIG. 3. To describe the behavior, we need Boolean variables $X[t][i]$ ($0 \leq t \leq 2$, $0 \leq i \leq 4$).

A behavior $s_0 \to s_4 \to s_1$ can be described as the following assignment. $X[0][0]$=true, $X[1][4]$=true, $X[2][1]$=true, and the other variables are false.

We construct a logical formula which represents the behavior of FSM M' and conditions for a test sequence using Boolean variables introduced above. To construct a logical formula, we decide a maximum length of test sequence T (a maximum value of time) in the proposed method of the first embodiment of the present invention.

(Conditions for Initial State)

The initial states of M' are included in the set $\{s_0\} \cup$ I'. Therefore, we construct a logical formula such that M' is in any of the states in $\{s_0\} \cup$ I' at time zero.

For example, the initial states of the FSM in FIG. 7 are states $s_0$, $s_{00}$ and $s_{01}$.

Therefore we construct the following logical formula.

$$(X[0][0] \vee X[0][00] \vee X[0][01]) \wedge \quad \text{(Formula 1)}$$

$$(\neg X[0][0] \vee \neg X[0][00]) \wedge$$

$$(\neg X[0][00] \vee \neg X[0][01]) \wedge$$

$$(\neg X[0][0] \vee \neg X[0][01])$$

(Conditions for States at Each Time)

We construct a logical formula which represents that the FSM is in one state in $S \cup S'$ at each time other than zero. For FSM in FIG. 7, the logical formula corresponding to states is the following formula.

$$(X[t][0] \vee X[t][1] \cdots \vee X[t][44]) \wedge \quad \text{(Formula 2)}$$

$$(\neg X[t][0] \vee \neg X[t][1]) \cdots \wedge$$

$$(\neg X[t][1] \vee \neg X[t][44]) \quad (1 \leq t \leq T)$$

In general, there exist some states in FSM which cannot be visited with one state transition (one time unit) from the initial state. We can reduce the size of the logical formula by considering such states.

(Conditions for State Transitions)

If we know a state of the FSM at time t, then states to which the FSM moves at time t+1 can be decided. Hence, we can describe a state transition as "state→disjunction of all states which can be visited with one transition from the state".

For example, the FSM shown in FIG. 7 can move from state $s_4$ to either states $s_1$ or $s_3$. Thus, the following formula is constructed.

$$X[t][4] \to (X[t+1][1] \neg X[t+1][3]) \ (0 \leq t \leq T-1) \quad \text{(Formula 3)}$$

(Conditions for UIO Sequences)

We construct a logical formula such that one of UIO sequences for each state must be visited at least once in any time between time zero to T. For example, if we add the state $s_{22}$ (which is not shown in the diagram) to the FSM of FIG. 7, we construct the following logical formula.

$$(X[0][22] \neg X[1][22] \neg \ldots \neg X[T][22]) \quad \text{(Formula 4)}$$

If there exist multiple UIO sequences for a state, then we construct a logical formula such that at least one state corresponding to the UIO sequences must be visited. For example, if we add the states $s_{00}$ and $s_{01}$ which represent UIO sequences for state $s_0$, we construct the following logical formula.

$$(X[0][00] \vee X[1][00] \vee \cdots \vee X[T][00]) \vee \quad \text{(Formula 5)}$$

$$(X[0][01] \vee X[1][01] \vee \cdots \vee X[T][01])$$

In addition, for overlapped UIO sequences, we construct a logical formula which represents that either the original UIO sequence or an overlapped sequence must be visited. Suppose that if we add the state $s_{31}$ (not shown in the diagram) which represents the UIO sequence for $s_3$, and the state $s_{44}$ (not shown in the diagram) which represents the UIO sequence for $s_4$ and the state $s_{41}$ (not shown in the diagram) which represents the sequence obtained by overlapping UIO sequences for states $s_3$ and $s_4$, respectively. We construct the following logical formula.

$$\{(X[0][31] \vee \cdots \vee X[T][31]) \vee \qquad \text{(Formual 6)}$$
$$(X[0][41] \vee \cdots \vee X[T][41])\} \wedge$$
$$\{(X[0][44] \vee \cdots \vee X[T][44]) \vee$$
$$(X[0][41] \vee \cdots \vee X[T][41])\}$$

Each logical formula described above can be translated into a conjunctive normal form easily. A logical formula which is a conjunction of the translated formula (from Formula 1 to Formula 6) represents the test sequence generation problem.

Then, in the step S3 described above, we can obtain a solution for the logical formula by applying it to the SAT solver. If we obtain a solution, then we can obtain the states in which the given FSM is at each time. After we restore the state which represents the UIO sequence to the states and the state transitions, we derive only the state transitions, then, we can obtain test sequences. For example, in the FSM of FIG. 7, the state $s_{00}$ which represents the UIO sequence is restored to the behavior $s_0 \rightarrow s_3 \rightarrow s_0$, and the test sequence can be obtained by deriving only the state transitions in the behavior.

In the proposed method of the first embodiment of the present invention, we must give the maximum length of test sequence T in the input. The value of T must be larger than the number of states, since the states which correspond to UIO sequences for each state must be visited at least once for checking states. If the value of T is too small, then we cannot obtain a solution. In that case, we construct and solve the logical formula again by giving a larger value to T.

Figure 10:
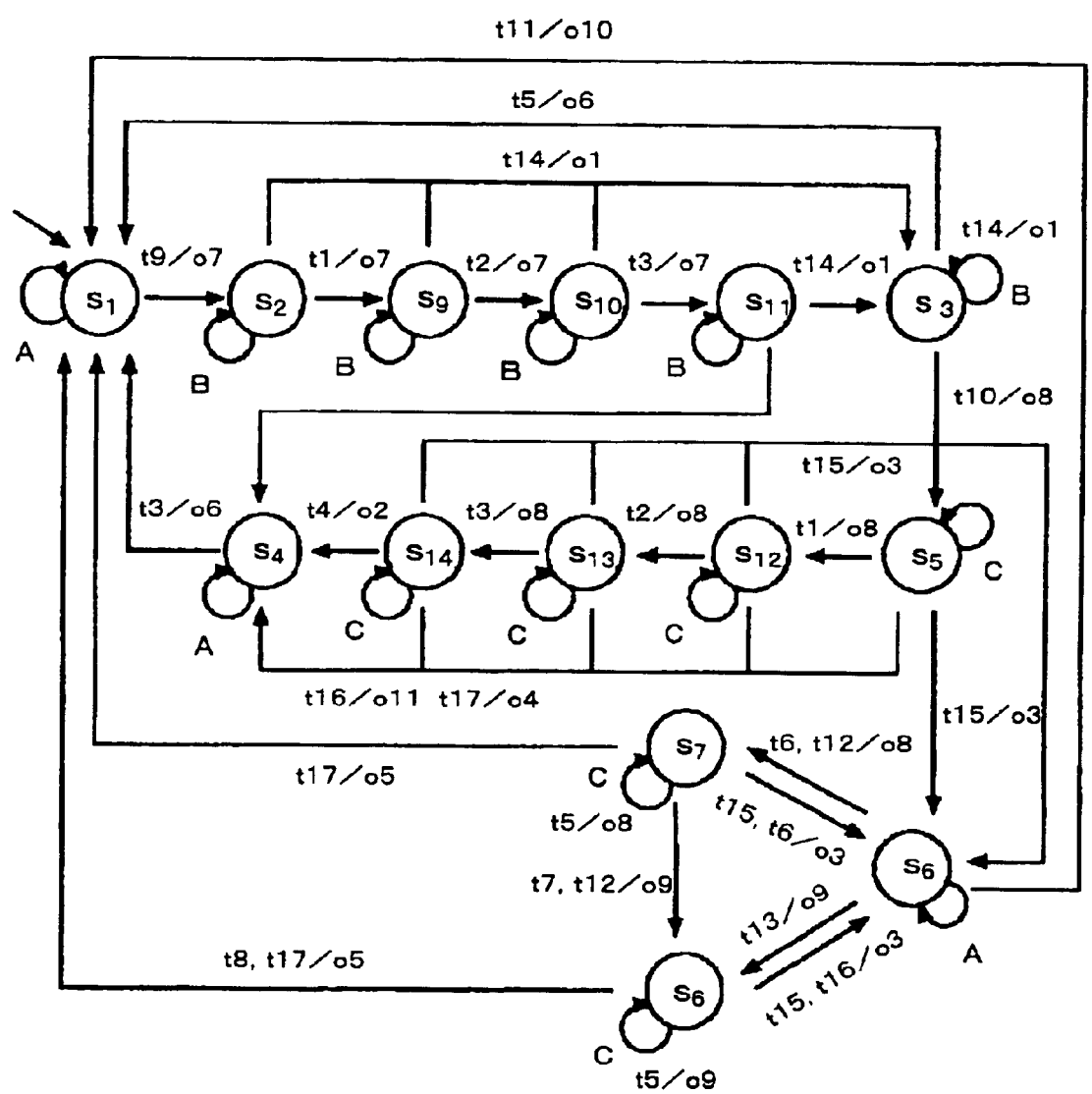
FIG. 10 is a diagram which shows the FSM representing the behavior of DHCP.

Next, we applied the method of generating test sequences of the first embodiment of the present invention to the FSM shown in FIG. 3 and to the FSM of FIG. 10 which represents the behavior of DHCP.

First, we generate the test sequences for the protocols represented by the FSM shown in FIG. 3. The number of clauses and the number of variables in the generated logical formula and the length of the generated test sequences are shown in FIG. 11.

Experiment 1 represents the case that we consider a single UIO sequence for each state. Experiment 2 represents the case that we consider multiple UIO sequences but do not consider overlapping of the UIO sequences. Experiment 3 represents the case that we consider a single UIO sequences and consider overlapping of UIO sequences. Experiment 4 represents the case that we consider a multiple UIO sequences and consider overlapping of UIO sequences.

We can obtain a shorter test sequence by considering sequence overlapping. In the experiment, the length of test sequences does not change while two UIO sequences for the state $s_0$ are prepared.

Next, we describe the result of the application to DHCP shown in FIG. 10. We generate a test sequence for a client protocol of DHCP. DHCP is the protocol which allocates IP addresses to clients dynamically by using DHCP server. The number of states of the FSM which represents DHCP is 14 and that of state transitions is 77.

We generate UIO sequences for each state in DHCP. Ten states have one UIO sequence and four states have two UIO sequences. We converted the test sequence generation problem to the logical formula and obtained test sequences by applying SAT solver. The length of the obtained test sequences was 21.

The number of variables of the generated logical formula and the number of the clauses and the time needed to generate and the time to execute SAT solver is shown in the first line of the table in FIG. 12. The execution time is the average of five trials (in seconds). The experiments are executed on a PC (CPU: Pentium III 700 MHz, Memory: 1 GB).

We allocated multiple sequences for each state and generated sequences. The results are shown in the second line, the third line and the fourth line of the table in FIG. 12. The second line shows the result of allocating one sequence for each state, the third line shows the result of allocating two sequences for each state, the fourth line shows the result of allocating three sequences for each state.

As described above, in the first embodiment of the present invention, we propose a test sequence generation method for FSM based communication protocol using SAT algorithm. The proposed method of generating test sequences to check whether the state is implemented in the IUT. In the proposed method, we can generate the minimum length test sequence considering multiple UIO sequences for each state and overlapping UIO sequences. And we can confirm that test sequences can be generated by applying the proposed method to DHCP.

The Second Embodiment

In the second embodiment of the present invention, we generate test sequences to check whether the state transition in the protocol specification is correctly implemented. The second embodiment also considers overlapping of the subsequences and uses SAT algorithm.

The second embodiment uses the MIPS_SAT as SAT solver to solve SAT problem as well as the first embodiment.

Figures 13, 14:
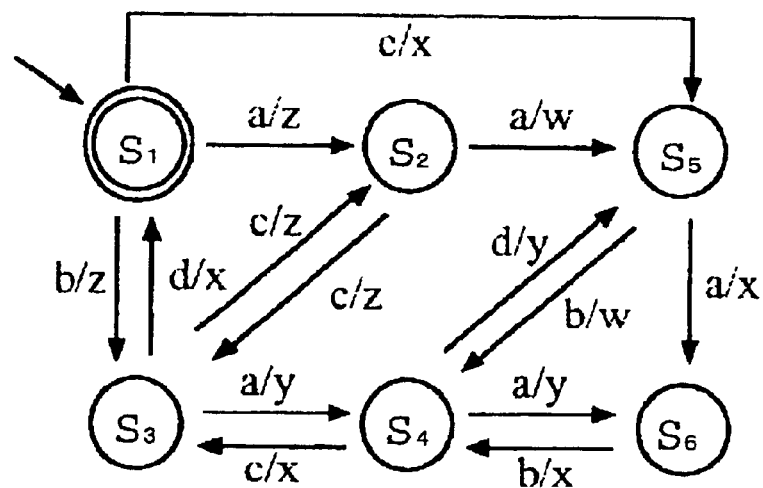
FIG. 13 is a diagram which shows the FSM.
FIG. 14 is a diagram which shows the UIO sequences.

Here, we describe the conformance testing. Using Mealy deterministic FSM, we represent the specification of the communication protocols. An example of FSM is shown in FIG. 13. Each state of the FSM corresponds to a state of the protocol, and each state transition corresponds to the operation of the protocol.

For the implementation based on the specification (IUT: Implementation Under Test), it is necessary to verify that each operation is correctly implemented (conformance testing). For example, the verification of the transition $s_2 \rightarrow s_5$ is performed as follows. The input/output action corresponding to the transition $s_2 \rightarrow s_5$ is a/w.
1. The IUT makes a transition from the initial state to state $s_2$.
2. Input a is presented and it is verified that output w is obtained.
3. It is verified that the IUT made a transition to state $s_5$. If we can verify that IUT is in state $s_5$, it is decided that the transition is correctly implemented.

By examining all state transitions by means of the above procedure, it is decided whether IUT conforms to the specification or not. For this purpose, it is important to distinguish between the states of the FSM.

One method for this purpose is the method which uses UIO sequences. For each state of the FSM in FIG. 13, UIO sequences are given in FIG. 14.

We can verify whether transitions are implemented correctly by using a transition sequence which obtained by concatenating a transition with the transition sequence for the UIO sequence of the state which is the destination of the transition. Here, the transition sequence obtained by concatenating a transition e and the transition sequence for the UIO sequence of the destination state of e is called a "subsequence", and is written as seq(e).

Next, we give a definition of test sequence generation problem in the second embodiment as follows.

(Input)
FSM M representing the protocol specification
A UIO sequence for each state of M
A set of state transitions E (E={$e_1, e_2, \ldots, e_n$}) to be tested
Order constraints and time constraints
The maximum test sequence length T (Output)
A test sequence (Constraints)
The test sequence starts from the initial state
The test sequence contains all subsequences {seq($e_i$) |$e_i \in E$} corresponding to E (Objective)
Minimization of the test sequence length An order constraint represents the order of execution of the transitions. A time constraint represents the time of transition execution, specifying that a transition can be executed only within a certain period after another transition is executed.

The conventional research proposes the method which generates a minimum length test sequence to check state transitions when a given FSM has reset transitions (the FSM returns to its initial state by executing the reset transition) or all states in a given FSM have self loops. However, the efficient method to generate the minimum length test sequence considering overlapping of the subsequences has not proposed yet. The second embodiment of the present invention generates the minimum length test sequence by considering the overlapping of the subsequences.

Figure 15:
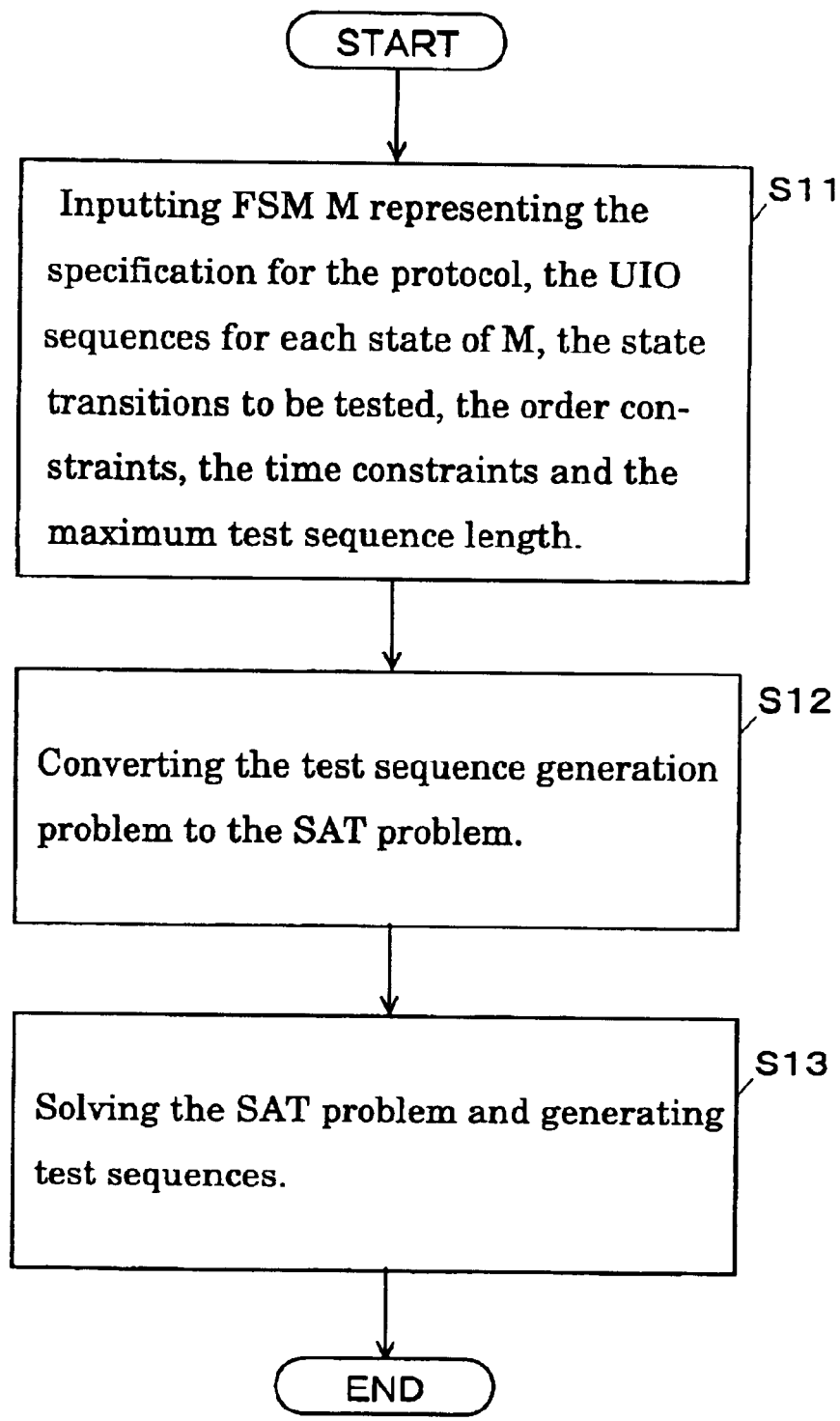
FIG. 15 is a diagram which shows the flowchart of generating test sequences.

The second embodiment generates the test sequence as follows. FIG. 15 is a diagram which shows the flowchart of generating the test sequence according to the second embodiment of the present invention.

Step S11: Inputting FSM M representing the specification for the protocol, the UIO sequence for each state of M, the state transitions to be tested, the order constraints, the time constraints and the maximum test sequence length. Step S11 is executed by the section of inputting the specification (FIGS. 1–11).

Step S12: Converting the test sequence generation problem to the SAT problem. Step S12 is executed by the section of converting the test sequence generation problem (FIGS. 1-12).

Step S13: Solving the SAT problem by applying the SAT solver (e.g. MIPS_SAT) and generating test sequences. Step S13 is executed by the section of generating test sequences (FIGS. 1-13).

The step of converting the test sequence generation problem to the SAT problem processed at the step S12 is comprised by the step of modifying the FSM with the section of modifying the FSM (FIG. 2-121) and by the step of representing the test sequence generation problem by a conjunctive normal form formula based on the modified FSM with the section of formulating a conjunctive normal form formula (FIG. 2-122).

In the second embodiment as well as in the first embodiment, X[t][i] are prepared as the Boolean variables making up a conjunctive normal form formula. X[t][i] is a variable that represents whether or not the FSM is in state $s_i$ at time t. When X[t][i] is true, the FSM is in state $s_i$ at time t. It is assumed that the FSM performs a transition in a time unit.

First, the step of modifying the FSM is described. In the second embodiment of the present invention, we modify the given FSM as follow to generate the minimum length test sequence.

(Modification of the FSM in the Final State)

Usually, the FSM arrives at the final state by a shorter sequence than the maximum test sequence length T which is given as an input. For this situation, a self-loop that returns a null output for a dummy input is added to the final state of the given FSM. Then, a test sequence of length T or less is generated. On the other hand, if the input sequence length is short and there exists no solution, a longer sequence length is inputted and the test sequence is generated.

(Modification of the FSM by Subsequences)

In the conversion of the test sequence generation problem to the SAT problem, a sequence that is certain to pass through the subsequence must be searched for. For this purpose, a new state corresponding to the subsequence of the state transition which is to be checked is added to the FSM.

The new state corresponding to the subsequence of the state transition which is to be checked is the state which has the same input transitions as the input transitions of the starting state of the subsequence of the state transition to be checked and which has the same output transitions as the output transitions of the destination state of the subsequences.

Figure 16:
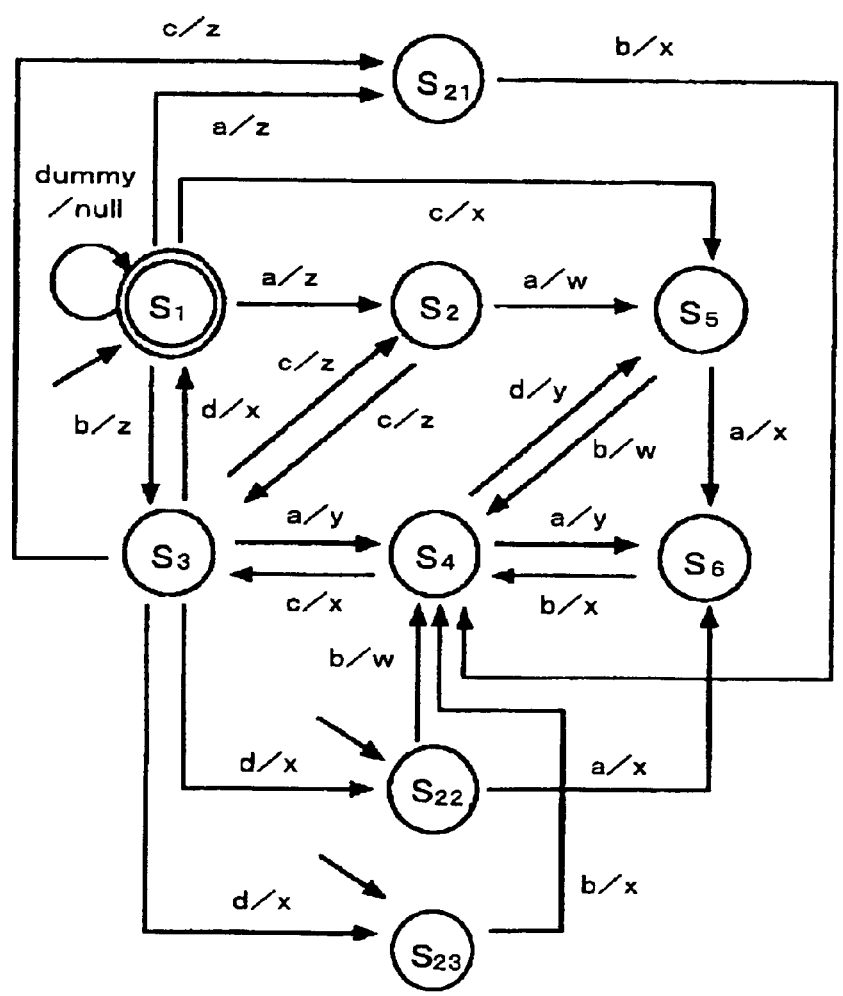
FIG. 16 is a diagram which shows the modified FSM.

Considering the case that we would like to check the state transition A: $s_2 \rightarrow s_5$ and the state transition B: $s_1 \rightarrow s_2$ in FSM of FIG. 13. The state transition A can be checked by using the subsequence seq(A): $s_2 \rightarrow s_5 \rightarrow s_6$. Therefore, the new state $s_{21}$ which represents seq(A) is added to FSM. As shown in FIG. 16, the state $s_{21}$ has the transitions $s_1 \rightarrow s_{21}$ and $s_3 \rightarrow s_{21}$ which are the same input transitions as the input transitions $s_1 \rightarrow s_2$ and $s_3 \rightarrow s_2$ which are the input transitions of the starting state $s_2$ of the seq(A) and the state $s_{21}$ has the transition $s_{21} \rightarrow s_4$ which is the same output transition as the output transition $s_6 \rightarrow s_4$ which is the output transition of the destination state $s_6$ of the seq(A).

Using the same method, shown in FIG. 16, the state $s_{22}$ which corresponds to the subsequence seq(B): $s_1 \rightarrow s_2 \rightarrow s_5$ and the state transitions corresponding to the state is added. Thus for the modified FSM, the test sequence generation problem is a problem of deriving the sequence starting from initial state $s_1$ and arriving at final state $s_1$, and passing through states $s_{21}$ and $s_{22}$. By replacing states $s_{21}$ and $s_{22}$ in the generated test sequence by the original subsequences seq(A) and seq(B), respectively, the test sequence is generated.

(Combining of Subsequences with Overlapping Parts)

In order to execute an efficient conformance testing, it is important to generate a test sequence with as short a sequence length as possible. Therefore, we consider overlap of subsequences. The example described above is used. Two subsequences seq(A) and seq(B) have a common part $s_2 \rightarrow s_5$.

In such a case, rather than generating a test sequence that passes separately through subsequences seq(A) and seq(B) represented by states $s_{21}$ and $s_{22}$, respectively, the test sequence length can sometimes be reduced by generating a sequence that passes through the new subsequence seq(A, B) ($s_1 \rightarrow s_2 \rightarrow s_5 \rightarrow s_6$), considering the overlapping part of subsequences seq(A) and seq(B).

In the proposed method of the second embodiment of the present invention, a new state representing the subsequence considering the overlap is added to the FSM, and the condition for transition A is modified to the condition that either seq(A) and seq(A, B) should be passed through at the step of representing the test sequence generation problem by a conjunctive normal form formula described later.

More precisely, a new state $s_{23}$ representing subsequence seq(A, B) considering the overlap of seq(A) and seq(B) is added, to form an FSM (FIG. 16), and the condition clause that either $s_{21}$ and $s_{23}$ must be passed through is composed at the step of representing the test sequence generation problem by a conjunctive normal form formula.

Next, by using FIG. 16, we describe the step of representing the test sequences generation problem by a conjunctive normal form formula based on the modified FSM. In the proposed method of the second embodiment of the present invention, the test sequence generation problem for the FSM is first converted to the following seven constraints. Then each constraint is translated to a conjunctive normal form formula and the test sequence is generated by applying the formula to the SAT solver.

Condition 1: Constraint of Staring from the Initial State

In FIG. 16, the initial state is $s_1$. The starting state of subsequence seq(B) is also $s_1$. As Condition 1, a clause stating that one of the states representing the initial state ($s_1$ or $s_{22}$ or $s_{23}$) must be selected, and a clause specifying that two or more states may not be selected simultaneously, are used. Their logical product is given as the constraint:

$$(X[0] \vee X[0][22] \vee X[0][23]) \wedge \quad \text{(Formula 7)}$$
$$(\neg X[0][1] \vee \neg X[0][22]) \wedge$$
$$(\neg X[0][1] \vee \neg X[0][23]) \wedge$$
$$(\neg X[0][22] \vee \neg X[0][23])$$

Condition 2: Constraint of Ending in the Final State at Time T

In FIG. 16, only si is the final state. If the final state of a subsequence is $s_1$, the state that represents that subsequence is regarded as the final state, and the same constraint as in Condition 1 is given. The condition is as follows in the case of FIG. 16:

$$X[T][1] \quad \text{(Formula 8)}$$

Condition 3: Constraint of Selection of a State at Each Time

This is the constraint that a single state must be selected at each state of the FSM in FIG. 16. A clause stating that one of the states (state $s_1 \sim s_{23}$) must be selected, and a clause stating that two or more states may not be selected simultaneously, are considered. The condition is represented as their logical product:

$$(X[t][1] \vee X[t][2] \vee X[t][3] \vee \cdots X[t][23]) \wedge \quad \text{(Formula 9)}$$
$$(\neg X[t][1] \vee \neg X[t][2]) \wedge$$
$$(\neg X[t][1] \vee \neg X[t][3]) \cdots \wedge$$
$$(\neg X[t][22] \vee \neg X[t][23]) \quad (0 < t < T)$$

Each state of the FSM can be reached from the initial state after a certain time. Similarly, the transition from each state to the final state can be made after a certain transition time. The number of clauses can be reduced by considering the time after which each state can be reached.

More precisely, in FIG. 16, the states that can be reached by a single transition from the initial state are seven states, excluding $s_{22}$ and $s_{23}$. By formulating (Formula 9) according to the above consideration, the number of clauses can be reduced.

Condition 4: Constraint of State Transition from Each State at Each Time

A state transition of the FSM is represented as "state∧input next state". By Conditions 1 and 3, it is represented as "state→logical sum of all states to which transition is possible". In FIG. 16, for example, transitions are possible from state $s_2$ to states $s_3$ and $s_5$. Consequently, the condition is written as follows:

$$X[t][2] \rightarrow (X[t+1][3] \neg X[t+1][5]) \quad (0 \leq t \leq T-1) \quad \text{(Formula 10)}$$

Condition 5: Constraint of Passing Through Subsequences

This is the constraint that each subsequence must be passed through at some time between the start and the end. This is represented by the constraint that the added states representing the subsequence (states $s_{21}$ and $s_{22}$ in FIG. 16) must be passed through:

$$(X[0][21] \vee X[1][21] \vee \cdots \vee X[T][21]) \wedge \quad \text{(Formula 11)}$$
$$(X[0][22] \vee X[1][22] \vee \cdots \vee X[T][22])$$

When there exist subsequences with an overlapping part as in FIG. 16, it suffices to pass through either $s_{21}$ or $s_{23}$ for transition A (either of $s_{22}$ and $s_{23}$ for transition B), and the following condition is obtained:

$$\{(X[0][21] \vee X[1][21] \vee \cdots \vee X[T][21]) \vee \quad \text{(Formula 12)}$$
$$(X[0][23] \vee X[1][23] \vee \cdots \vee X[T][23])\} \wedge$$
$$\{(X[0][22] \vee X[1][22] \vee \cdots \vee X[T][22]) \vee$$
$$(X[0][23] \vee X[1][23] \vee \cdots \vee X[T][23])\}$$

Condition 6: Constraint Representing Order Conditions

The order constraint is a constraint concerning the order of execution of multiple transitions. Consider subsequences seq(A) and seq(B) in FIG. 16, for example. If there exists a constraint that subsequence seq(A) must be executed before subsequence seq(B) is executed, the constraint is represented as follows:

$$\{(X[t][21] \rightarrow X[t+1][22] \vee \quad \text{(Formula 13)}$$
$$X[t+2][22] \vee \cdots \vee X[T][22])\} \wedge$$
$$\{X[t][21] \rightarrow$$
$$(\neg X[t-1][22] \vee \neg X[t-2][22] \vee \cdots \vee \neg X[0][22])\}$$
$$(0 \leq t \leq T-1)$$

Condition 7: Time Constraint

The time constraint is a constraint concerning the execution time of transitions. Examples are a condition that a certain transition must be executed within a specified time from the initial state, and a condition that a certain transition must be executed within a specified time after the execution of another transition.

As an example, suppose that subsequence seq (A) must be executed subject to the condition $0 \leq t \leq 10$. In this case, the constraint is represented as follows:

$$X[0][21] \neg X[1][21] \neg \ldots \neg X[10][21] \quad \text{(Formula 14)}$$

Based on the conditional clauses composed from the above seven constraints, we formulate a logical product of these conditional clauses. The logical product is a conjunctive normal form formula corresponding to the test sequence generation problem. The formula is applied to the SAT solver, and the solution is derived.

In the proposed method, the maximum test sequence length T is specified in the input. The test sequence must pass through the states corresponding to the subsequences. Therefore a value larger than the number of subsequences should be given as the initial value of T.

(Application to DHCP)

We applied the present invention's method to generate test sequences to the FSM shown in FIG. 10 representing the operation of DHCP. The number of states and state transitions in the FSM are 14 and 77, respectively.

(Result of Execution Without Order and Time Constraints)

For DHCP, a UIO sequences is composed for each state. The test sequence is generated while varying the number of state transitions to be tested. The number of the specified state transitions are 30, 45, 60, 70 and 77. FIG. 17 shows the result.

The number in parentheses in the sequence length is the sequence length when the state representing the subsequence is restored to the original state transition. The execution time is the average of five trials (in seconds). The execution environment was CPU: Pentium III 700 MHz with 1 GB of memory. It is confirmed that sequence for DHCP can be generated in a practical time.

(Result of Execution with Order and Time Constraints)

An evaluation was performed for a test sequence generation problem including order and time constraints. As an example, two order constraints and two time constraints were set. The result is shown in FIG. 18. It is confirmed that the test sequence can be generated in nearly the same computation time, no matter whether or not constraints exist, although the number of clauses is increased due to the constraints.

(Result of Execution Considering Overlap of Subsequences)

An evaluation of the generation of a test sequence considering overlap of subsequences was also performed. In DHCP, there exist 14 overlapping combinations of two subsequences and three overlapping combinations of three subsequences. The condition considering the overlap of two subsequences is called condition 1, and the condition considering the overlap of three subsequences is called condition 2. A test sequence was generated for each condition. The results are shown in FIG. 19.

When the overlap condition is not considered, the sequence length is 91 (342); in comparison, it is 74 (321) when condition 1 is considered, and 71 (313) when conditions 1 and 2 are considered. Thus shorter test sequences are generated. In terms of the execution time, a test sequence with a shorter execution time than the test sequence without allowance for overlap was generated. Thus the proposed method of the second embodiment of the present invention is also useful in taking account of the overlap of subsequences.

(Comparison to Conventional Method)

Using the conventional method which generates the test sequence which checks state transitions when a given FSM has reset transitions (the FSM can return to its initial state by executing the reset transition) or all states in a given FSM have self loops, a test sequence was generated to verify all state transitions in DHCP. Here we generate test sequences considering the overlap of subsequences.

As we discussed above, there exist 14 overlapping combinations of two subsequences in DHCP. Then, for each combination there can be two cases, consisting of whether the original sequence or the overlapping sequence is used. Consequently, there can be $2^{14}$ combinations of subsequences.

Depending on the problem, it may be possible to decide which sequence should be used. In the derivation of the optimal test sequence using the conventional method, in general, the combination of subsequences is specified each time, and the problem must be solved $2^{14}$ times. According to the results of our experiments, it takes 0.14 seconds to generate a test sequence using the conventional method without considering overlap of subsequences. Therefore, the required time is estimated as $0.14 \times 2^{14} = 2293.76$ seconds.

In the proposed method of the second embodiment of the present invention, on the other hand, the test sequence can be generated in approximately 262 seconds, as shown by the results in the second row of the table shown in FIG. 19.

(Discussion of Sequence Length and Execution Time)

In the proposed method of the second embodiment of the present invention, the maximum test sequence length T is given as the input. The initial value of the sequence length should be such that a test sequence exists and the solution can be derived in a practical time.

When the sequence length is set large, the solution can be derived in a short time, since the number of solutions is increased. However, the number of clauses and the number of variables are also increased. In the SAT problem, in general, the time required to derive the solution tends to be increased when the number of clauses or the number of variables is increased. Therefore, we investigate how the sequence length T affects the generation time for the test sequence. As an example, a test sequence generation problem considering overlapping condition 1 is used. The result is shown in FIG. 20.

When the sequence length is increased, the number of clauses and variables is increased. When the sequence length is 76 and 80, the execution time is reduced. However, the execution time increases for sequence lengths of 90 and 100. The solution to this problem is easily obtained and the generation time is within the practical range if the sequence length is about 100.

In this case, it is estimated that the number of subsequences multiplied by 1.29 is likely to be a suitable initial value for the sequence length, since 77 (the number of subsequences) into 100 (sequence length) gives 1.29. According to the results of several experiments, if the number of subsequences multiplied by approximately 1.25 is used as the initial value for the sequence length, a solution can be obtained in most cases and the generation time stays within a practical range.

What is claimed is:

1. The method to generate test sequences for communication protocols, the method comprising:

a step of inputting a specification in which data of finite state machines (FSM) representing a specification of the communication protocols is inputted;

a step of converting a test sequence generation problem which converts the test sequence generation problem to a satisfiability (SAT) problem; and a step of generating test sequences for communication protocols in which the SAT problem is solved and the test sequences for communication protocols are generated.

2. The method to generate test sequences for communication protocols set forth in claim 1 wherein the test sequence generation problem is the problem which generates test sequences to check whether the states described in the specification of communication protocols exist in the implementation of the FSM.

3. The method to generate test sequences for communication protocols set forth in claim 1 wherein the test sequence generation problem is the problem which generates test sequences to check whether the state transitions described in the specification of communication protocols are correctly implemented in the implementation of the FSM.

4. The method to generate test sequences for communication protocols set forth in claim 1 or claim 2 or claim 3 wherein the step of converting the test sequence generation problem is comprising:

a step of modifying the FSM; and a step of representing the test sequence generation problem by a conjunctive normal form formula based on the modified FSM.

5. The method to generate test sequences for communication protocols set forth in claim 2 wherein the step of converting the test sequence generation problem is comprising:

a step of modifying the FSM; and a step of representing the test sequence generation problem by a conjunctive normal form formula based on the modified FSM;

and the step of modifying the FSM is comprising a step of adding the state corresponding to a unique input/output sequence of each state in the FSM to be checked and the state transitions of the state to the FSM.

6. The method to generate test sequences for communication protocols set forth in claim 5 wherein the state corresponding to the UIO sequence of the each state in the FSM to be checked is the state which has the same input transitions as the input transitions of the starting state of the UIO sequence of the state to be checked and has the same output transitions as the output transitions of the destination state of the UIO sequence of the state to be checked.

7. The method to generate test sequences for communication protocols set forth in claim 3 wherein the step of converting the test sequence generation problem is comprising:

a step of modifying the FSM; and a step of representing the test sequence generation problem by a conjunctive normal form formula based on the modified FSM;

and the step of modifying the FSM is comprising the step of adding the state corresponding to a subsequence of the state transitions in the FSM to be checked to the FSM.

8. The method to generate test sequences for communication protocols set forth in claim 7 wherein the state corresponding to the subsequence of the state transitions in the FSM to be checked is the state which has the same input transitions as the input transitions of the starting state of the subsequence of the state transition to be checked and which has the same output transitions as the output transitions of the destination state of the subsequence.

9. The apparatus to generate test sequences for communication protocols, the apparatus comprising:

a section of inputting a specification which input the of finite state machines (FSM) representing a specification of the communication protocols;

a section of converting a test sequence generation problem which converts the test sequence generation problem to a satisfiability (SAT) problem; and a section of generating test sequences for communication protocols which solves the SAT problem and generates the test sequences for communication protocols.

10. The apparatus to generate test sequences for communication protocols set forth in claim 9 wherein the test sequence generation problem is the problem which generates test sequences to check whether the states described in the specification of communication protocols exist in the implementation of the FSM.

11. The apparatus to generate test sequences for communication protocols set forth in claim 9 wherein the test sequence generation problem is the problem which generates test sequences to check whether the state transitions described in the specification of communication protocols are correctly implemented in the implementation of the FSM.

12. The apparatus to generate test sequences for communication protocols set forth in claim 9 or claim 10 or claim 11 wherein the section of converting the test sequence generation problem is comprising:

a section of modifying the FSM which modifies the FSM; and a section of formulating a conjunctive normal form formula which describes the test sequence generation problem by using a conjunctive normal form formula based on the modified FSM.

13. The apparatus to generate test sequences for communication protocols set forth in claim 10 wherein the section of converting the test sequence generation problem is comprising:

a section of modifying the FSM which modifies the FSM; and a section of formulating a conjunctive normal form formula which describes the test sequence generation problem by using a conjunctive normal form formula based on the modified FSM;

and the section of modifying the FSM adds the state corresponding to a unique input/output sequence of the each state in the FSM to be checked and the state transitions of the state to the FSM.

14. The apparatus to generate test sequences for communication protocols set forth in claim 13 wherein the state corresponding to the UIO sequence of each state in the FSM to be checked is the state which has the same input transitions as the input transitions of the starting state of the UIO sequence of the state to be checked and has the same output transitions as the output transitions of the destination state of the UIO sequence of the state to be checked.

15. The apparatus to generate test sequences for communication protocols set forth in claim 11 wherein the section of converting the test sequence generation problem is comprising:

a section of modifying the FSM which modifies the FSM; and a section of formulating a conjunctive normal form formula which describes the test sequence generation problem by using a conjunctive normal form formula based on the modified FSM;

and the section of modifying the FSM adds the state corresponding to a subsequence of the state transitions in the FSM to be checked to the FSM.

16. The apparatus to generate test sequences for communication protocols set forth in claim 15 wherein the state corresponding to the subsequence of the state transitions in the FSM to be checked is the state which has the same input transitions as the input transitions of the starting state of the subsequence of the state transition to be checked and which has the same output transitions as the output transitions of the destination state of the subsequence.

* * * * *

UNITED STATES PATENT AND TRADEMARK OFFICE
CERTIFICATE OF CORRECTION

PATENT NO. : 7,035,747 B2 Page 1 of 1
APPLICATION NO. : 10/689553
DATED : April 25, 2006
INVENTOR(S) : Takanori Mori et al.

It is certified that error appears in the above-identified patent and that said Letters Patent is hereby corrected as shown below:

Column 17, line 56, after "input" delete "the of"

Signed and Sealed this

Tenth Day of April, 2007

JON W. DUDAS
*Director of the United States Patent and Trademark Office*